US005600717A

United States Patent [19]
Schneider et al.

[11] Patent Number: 5,600,717
[45] Date of Patent: *Feb. 4, 1997

[54] COMBINATION TELEPHONE NETWORK INTERFACE AND CABLE TELEVISION APPARATUS AND CABLE TELEVISION MODULE

[75] Inventors: Pina R. Schneider, Matawan; Eric J. Hermsen, Howell; Frank S. Siano, Spotswood, all of N.J.

[73] Assignee: Antec Corp., Rolling Meadows, Ill.

[ * ] Notice: The term of this patent shall not extend beyond the expiration date of Pat. No. 5,394,466.

[21] Appl. No.: 658,428

[22] Filed: Jun. 14, 1996

Related U.S. Application Data

[63] Continuation of Ser. No. 266,188, Jun. 27, 1994, abandoned, which is a continuation-in-part of Ser. No. 18,327, Feb. 16, 1993, Pat. No. 5,394,466.

[51] Int. Cl.⁶ .................................................. H04M 11/00
[52] U.S. Cl. ........................ 379/399; 379/412; 348/8
[58] Field of Search .................................. 379/326, 397, 379/399, 412, 90, 53; 348/6, 7, 8, 10; 439/578, 579, 580, 581, 582, 583, 498, 92; 361/601, 602, 641, 823, 826, 827, 828

[56] References Cited

U.S. PATENT DOCUMENTS

| | | | |
|---|---|---|---|
| 3,610,810 | 10/1971 | Fribley, Jr. ............................ | 361/641 X |
| 3,760,130 | 9/1973 | Ross et al. ............................ | 361/641 X |
| 3,989,333 | 11/1976 | Cauldwell ............................. | 361/641 X |
| 4,133,021 | 1/1979 | King et al. ............................ | 361/660 |
| 4,266,266 | 5/1981 | Sanner .................................. | 361/643 |
| 4,578,702 | 3/1986 | Campbell, III ........................ | 348/6 X |
| 4,764,849 | 8/1988 | Khan .................................... | 361/827 |
| 4,785,376 | 11/1988 | Dively .................................. | 361/641 X |
| 4,794,490 | 12/1988 | Epstein ................................. | 361/827 |
| 4,873,600 | 10/1989 | Vogele .................................. | 361/823 |
| 4,887,187 | 12/1989 | Nickola ................................ | 361/826 X |
| 4,912,615 | 3/1990 | Bluband ............................... | 361/827 |
| 4,945,559 | 7/1990 | Collins et al. ........................ | 379/399 |
| 4,949,376 | 8/1990 | Nieves et al. ........................ | 379/399 |
| 4,979,209 | 12/1990 | Collins et al. ........................ | 379/399 |
| 5,117,122 | 5/1992 | Hogarth et al. ...................... | 307/140 |
| 5,130,893 | 7/1992 | Straate et al. ........................ | 361/728 |
| 5,160,271 | 11/1992 | Franks, Jr. ........................... | 439/92 |
| 5,184,279 | 2/1993 | Horn ..................................... | 361/641 |
| 5,196,988 | 3/1993 | Horn ..................................... | 361/651 |
| 5,247,347 | 9/1993 | Litteral et al. ....................... | 348/14 X |
| 5,327,114 | 7/1994 | Straate et al. ........................ | 340/286.06 |
| 5,359,654 | 10/1994 | Jensen et al. ........................ | 379/399 X |
| 5,363,432 | 11/1994 | Martin et al. ........................ | 379/90 |
| 5,408,260 | 4/1995 | Arnon .................................. | 348/6 |
| 5,440,335 | 8/1995 | Beveridge ............................ | 348/13 |
| 5,469,495 | 11/1995 | Beveridge ............................ | 348/14 X |

OTHER PUBLICATIONS

Siecor Corp. CAC® 7750 Telephone Network Interface Installation ForV5 West © 1993, 1994, one (1) page, copy attached.
Keptel Brochure, RVCT, CATV/Telephone Weatherproof Interface Unit, two pages duplexed, © 1989 Keptel, Inc.
Keptel Brochure, Cable Guard, OPE 9200, two pages duplexed, © 1994 Keptel, Inc.

*Primary Examiner*—Krista M. Zele
*Assistant Examiner*—Scott L. Weaver
*Attorney, Agent, or Firm*—R. Gale Rhodes, Jr.

[57] ABSTRACT

Cable television module and combination cable television module and telephone network interface apparatus including a pair of coaxial cable connectors at least one of which disposed angularly with respect to each other to facilitate connection with coaxial cables entering the telephone network interface apparatus and connected to one or more television sets of a telephone subscriber whose subscriber line is connected to an incoming telephone line through the telephone network interface apparatus.

45 Claims, 9 Drawing Sheets

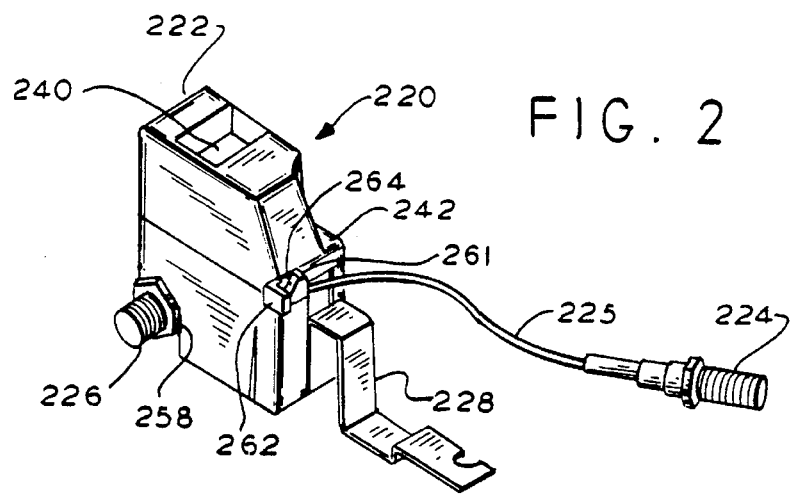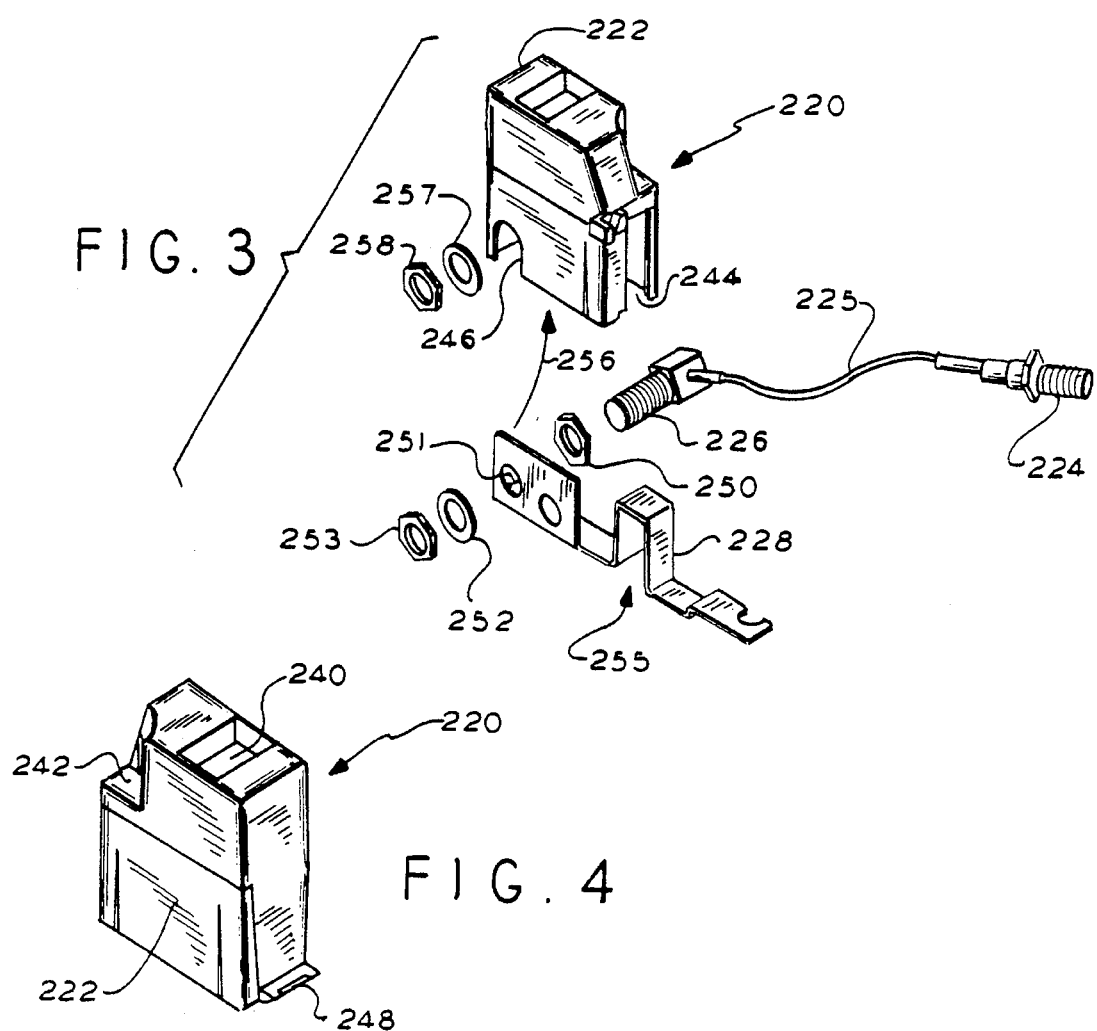

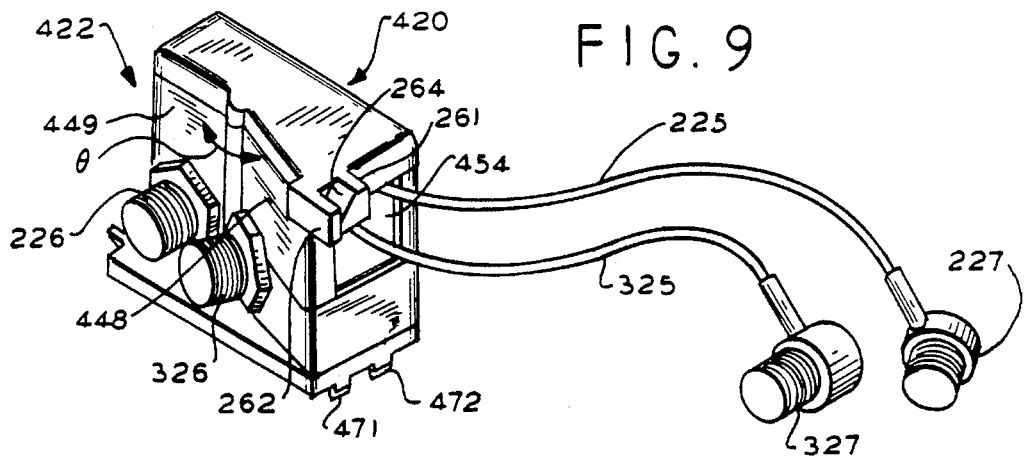
FIG. 9
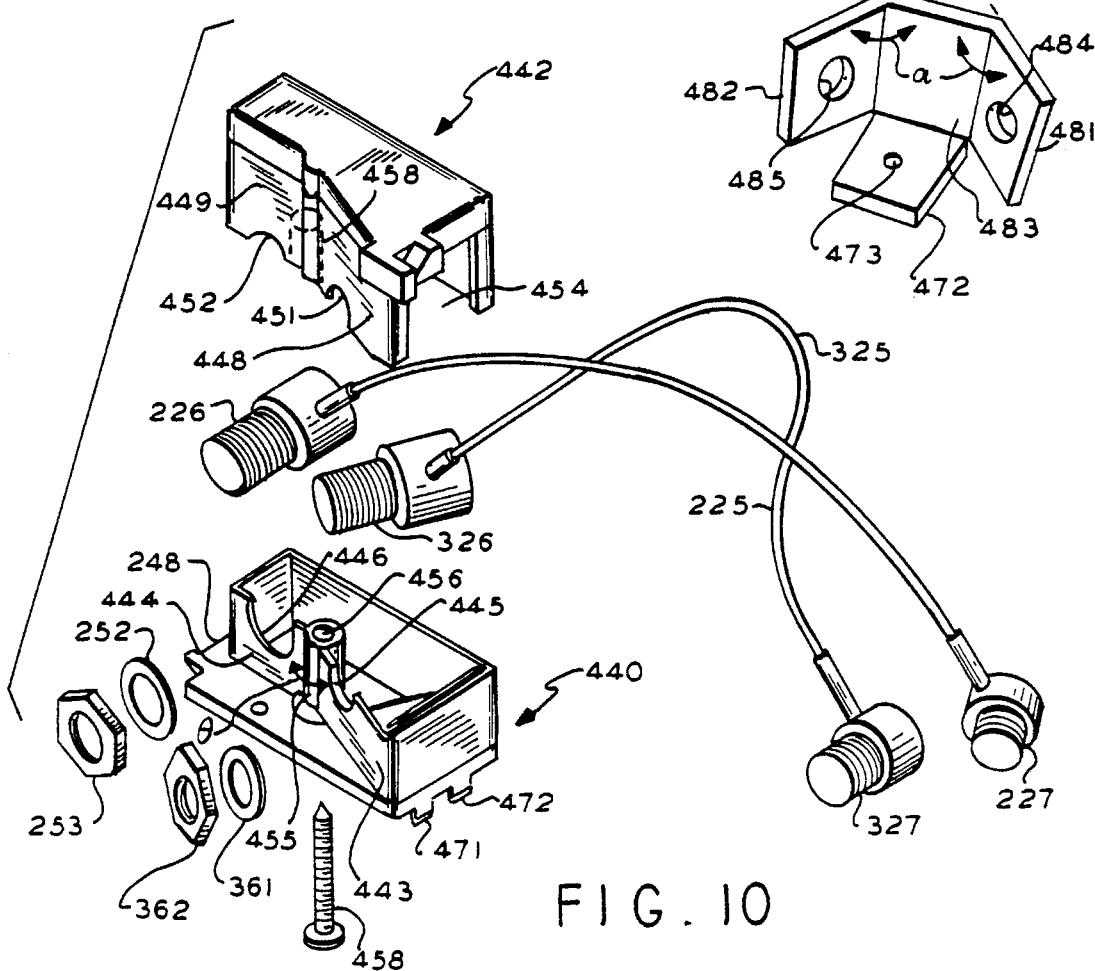
FIG. 11
FIG. 10

COMBINATION TELEPHONE NETWORK INTERFACE AND CABLE TELEVISION APPARATUS AND CABLE TELEVISION MODULE

This application is a continuation, of application Ser. No. 08/266,188, filed Jun. 27, 1994, now abandoned as of the filing date of this continuation application, which application is a continuation-in-part of Ser. No. 08/018,327, filed Feb. 16, 1993, now U.S. Pat. No. 5,394,466.

BACKGROUND OF THE INVENTION

This invention relates to combination apparatus for connecting incoming telephone company wiring or lines to telephone subscriber premises wiring or lines and for connecting incoming cable television signals to one or more television sets such as for example the television set or sets of a telephone company subscriber or customer.

This invention further relates to a cable television module particularly useful for being mounted, for example removably mounted, to telephone network interface apparatus through which one or more incoming telephone lines can be connected to one or more telephone subscriber's or telephone customer's telephones. The module is for connecting incoming cable television signals to one or more televisions sets, for example a television set or sets belonging to one of the telephone company subscribers or customers.

Numerous telephone network interface apparatus are known to the art for being mounted at a multiple dwelling such as an apartment house or condominium and which telephone network interface apparatus are for connecting one or more incoming telephone lines, typically a plurality of incoming telephone lines, to one or more telephone subscriber's or customer's telephones located at various apartments or condominiums comprising the multiple dwelling. Also known to the art are telephone network interface apparatus including one or more individual subscriber line modules, typically a plurality of such modules, with each individual subscriber line module for connecting one incoming telephone company line to one of the telephone customer's telephones. Such individual subscriber line modules, as known to the art, provide a demarcation point, telephone demarcation point, between a telephone subscriber's or customer's line and an incoming telephone line to facilitate the determination of whether a fault exists on the telephone customer or subscriber's line or the incoming telephone company line. Such telephone network interface apparatus and the individual subscriber line modules, as is also known to the art, are typically located in a common area, such as the basement of the apartment house or condominium, whereby a telephone repairman can make a ready determination of whether or not such fault exists on the telephone subscriber's line or the incoming telephone line regardless of whether the telephone subscriber or customer is home or not; such individual subscriber line module also permits the telephone customer or subscriber to make the determination of whether a fault exists on the telephone customer or subscriber's line or the incoming telephone company line. Examples of such telephone network interface apparatus and individual subscriber line modules are disclosed in U.S. Pat. No. 4,945,559, patented Jul. 31, 1990, entitled TELEPHONE NETWORK INTERFACE APPARATUS, and U.S. Pat. No. 4,979,209, patented Dec. 18, 1990 entitled INDIVIDUAL SUBSCRIBER LINE MODULE; Thomas J. Collins et al. are inventors of both patents and both patents are assigned to the same assignee as the present invention. These patents are incorporated herein by reference as if fully reproduced herein and U.S. Pat. No. 4,979,209 is referred to hereinafter as the "209 patent."

Cable television signals are typically transmitted to a multiple dwelling over an optical fiber line which terminates at an optical network unit typically located curbside to the above-noted multiple dwelling. Typically a plurality of coaxial cables run from the optical network unit to the above-noted individual apartments or condominiums to connect the incoming cable television signals directly, or through a cable television channel selector, to the individual television sets of the cable television customers residing in the apartments or condominiums. Should one of such television sets fail to provide a television picture and audio signals or sound, a question arises in the mind of the television customer as to whether the television set is not working or whether cable television signals are not being received. The television customer typically calls the cable television company and reports the failure and then arrangements must be made to coordinate the time at which a cable television repairman can come to the television customer's apartment or condominium with the time at which the television customer is home. This is particularly difficult due to the fact that cable television repairmen typically work 8:00 or 9:00 a.m. to 5:00 p.m., and television customers, including husbands and wives, typically also work 8:00 or 9:00 a.m. to 5:00 p.m.

Accordingly, there exists a need in the art for apparatus for interconnecting a television customer's television set to incoming cable television signals which provides a cable television demarcation point between such television set and the source of such cable television signals to permit a cable television repairman to make a reasonable determination as to whether or not the failure of the television set to provide a television picture and sound is due to the television set not working or the failure to receive incoming cable television signals, and to permit such cable television repairman to make such determination while the television customer is not present at the apartment or condominium.

There also exists a need in the art for such cable television apparatus providing such cable television demarcation point and which permits the television customer to make a reasonable determination as to whether or not the failure of the television set to provide a television picture and sound is due to the television set not working or the failure to receive incoming cable television signals. If the determination indicates that the failure is due to the customer's television set not working, the customer has the television set repaired or replaced and avoids a service call from the cable television repairman and its needless attendant cost.

There further exists a need in the art for combination apparatus for connecting one or more incoming telephone company lines to one or more telephone subscribers' or customers' lines and for connecting incoming cable television signals to one or more television sets which may be, for example, the television set or sets of a telephone customer or subscriber.

Still there exists a further need in the art for cable television apparatus and cable television module which is provided with a configuration which facilitates the interconnection of coaxial cables from the customer(s) television set(s) to the module and/or which facilitates connection of coaxial cables carrying incoming cable television signals to the module or to a ground bracket.

SUMMARY OF THE INVENTION

It is the object of the present invention to satisfy the foregoing needs in the art.

Apparatus satisfying the foregoing needs and embodying the present invention may include combination telephone network interface apparatus for interconnecting at least one incoming telephone line with at least one telephone subscriber premises line and a cable television module mounted to the telephone network interface apparatus and which module includes a first pair of connectors for being connected to a pair of outgoing coaxial cables for carrying incoming television signals to a television set or sets and a second pair of coaxial cable connectors for being connected to a pair of incoming coaxial cables carrying the incoming cable television signal, the pairs of coaxial cable connectors are interconnected by interconnecting coaxial cables.

In one embodiment of the present invention, the first pair of coaxial cable connectors are mounted on the module at an angle with respect to each other to facilitate connection of the outgoing coaxial cables to the first pair of coaxial cable connectors. In a further embodiment, the second pair of coaxial cable connectors are mounted on the module at an angle with respect to each other to facilitate connection to the pair of incoming coaxial cables. In a still further embodiment a ground bracket is included and to which the second pair of coaxial cable connectors are mounted and disposed at an angle with respect to each other to facilitate connection of such connectors to the incoming coaxial cables. In yet a further embodiment, the cable television module includes a shielding portion for covering and shielding the interconnecting coaxial cables when the module is mounted to the telephone network interface apparatus.

The present invention includes the combination telephone network interface apparatus and cable television modules described above and the modules independently.

DESCRIPTION OF THE DRAWINGS

FIG. 2 is a perspective view of a first embodiment of a cable television module embodying the present invention and which module is shown in the assembled condition;

FIG. 3 is a perspective exploded view of the cable television module of FIG. 1 shown in the disassembled condition;

FIG. 4 is a reverse side view, in perspective, of the module housing shown in FIG. 3;

FIG. 9 is a perspective view of an alternate embodiment of a cable television module of the present invention shown in the assembled condition;

FIG. 10 is a perspective view of the alternate cable television module of FIG. 9 shown in the disassembled condition;

FIG. 11 is a perspective view of a ground bracket of the present invention;

DESCRIPTION OF THE PREFERRED EMBODIMENTS

Figure 1:
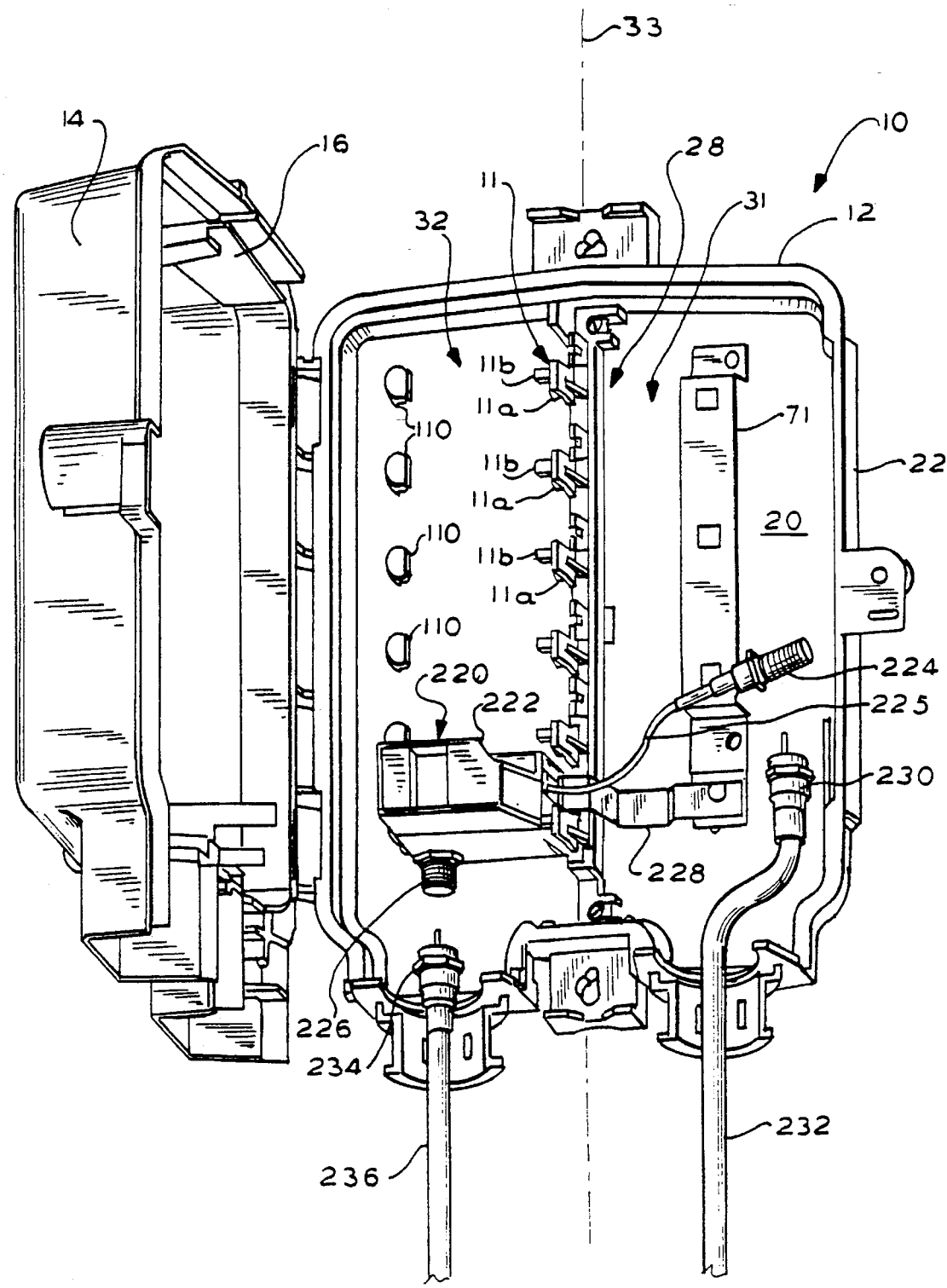
FIG. 1 is a front perspective view showing an embodiment of combination telephone network interface apparatus and a cable television module mounted to the telephone network interface apparatus, the telephone network interface apparatus is substantially the same as that disclosed in the '209 patent.

Referring to FIG. 1, it will be understood that the telephone network interface apparatus indicated by general numerical designation 10 is substantially the same as the telephone network interface apparatus disclosed in the '209 patent and also indicated by general numerical designation 10. Telephone network interface apparatus of FIG. 1 differs from that of the '209 patent in that it includes an upwardly extending module mounting or retaining member indicated by general numerical designation 11. For convenience of reference, the structural elements of the telephone network apparatus 10 of FIG. 1 corresponding to the same structural elements of the telephone network interface apparatus disclosed in the '209 patent have been given the same numerical designations as in the '209 patent and, although the '209 patent has been incorporated herein by reference, for convenience of reference a brief description of the primary structural elements of the telephone network interface apparatus 10 will be presented as well as a brief explanation of the functions of such primary structural elements.

Figure 5:
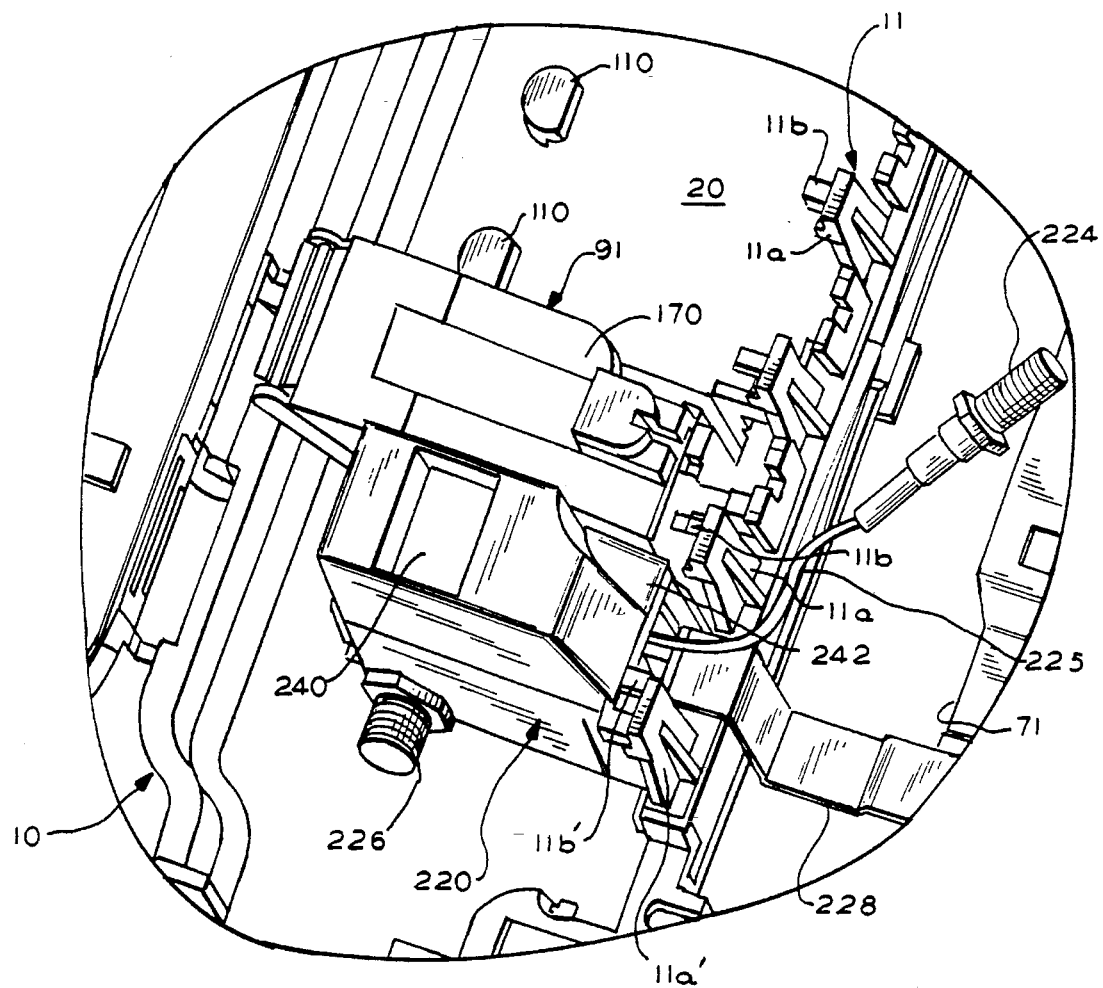
FIG. 5 is a combination embodiment of the present invention comprising telephone network interface apparatus including an enlarged view in perspective of a portion of FIG. 1 and shows an individual subscriber line module mounted to the telephone network interface apparatus laterally of and in close proximity to a cable television module, the individual subscriber line module is for connecting an incoming telephone line to a subscriber premises line.

The telephone network interface apparatus 10 of FIG. 1 comprises a housing including a base 12, a telephone company cover 14, and a subscriber cover 16. Base 12 includes a bottom 20 circumscribed by an upwardly extending wall 22 and the telephone company and subscriber covers 14 and 16 are mounted pivotally to the wall 22 as shown. The bottom 20 and wall 22 provide a compartment indicated by general numerical designation 28 and which compartment 28 is divided by the diagrammatical dividing line 33 into a telephone company compartment portion 31 and a telephone subscriber compartment portion 32. As taught in the '209 patent, the telephone company cover 14 is for being fastened only to the base 12 such as for example by a hex-headed screw, not shown, which is not easily removable by a subscriber and which requires a special type of tool not typically possessed by the subscriber but which tool is typically possessed by telephone company personnel to permit such telephone company personnel to unfasten the telephone company cover 14 from the base 12. The subscriber cover 16 is for being fastened only to the telephone company cover 14 such as for example by a screw not shown in FIG. 1. Such fastening denies the telephone customer or subscriber access to the telephone company compartment portion 31 but permits the telephone subscriber to unfasten the subscriber cover 16 from the telephone company cover 14 to gain access to the telephone subscriber compartment portion 32 which permits the telephone customer to have access to the demarcation point provided by the telephone customer's individual subscriber line module as taught in the '209 patent. Such fastening of the covers 14 and 16 also permits telephone company personnel to unfasten the telephone company cover 14 from the base 12 to thereby gain access to both the telephone company compartment 31 and the subscriber compartment 32 as is also taught in the '209 patent. A ground buss 71 is suitably mounted in the telephone company compartment 31, such as by screws not shown, and the ground buss is connected to earth ground by suitable means not shown as taught in the '209 patent. The module mounting or retaining member 11 is mounted suitably to the bottom 20 of the base 12 such as by screws not shown, and extends upwardly therefrom generally along the dividing line 33. The module mounting or retaining member 11 includes a plurality of upwardly extending flexible members 11a each provided with an outwardly extending tab 11b for being received within a notch provided on the cable television modules embodying the present invention or which tab 11b is also for extending over and wedgedly engaging a portion of the individual subscriber line module 91 as shown in FIG. 5 and described in further detail below. The module mounting or retaining member 11 may be suitably mounted to the bottom 20 of the base 12 such as by screws not shown and may be made of a suitable plastic to provide the upwardly extending members 11b with suitable flexibility and resiliency; the member 11 may be made suitably such as for example by injection molding. A plurality of upwardly extending inverted L-shaped members 110 are provided on the bottom 20. As described in detail below the members 110 cooperate with the tabs 11b in mounting the cable television module 220 removably to the telephone network interface apparatus 10; members 110 are the members 110 shown in cross-sectional side view in FIG. 10 of the '209 patent.

A cable television module embodying the present invention and indicated by numerical designation 220 is shown mounted to the telephone network interface apparatus 10 in FIG. 1. Generally, the cable television module 220 includes a housing 222, a first female coaxial cable connector 224 interconnected by a length of coaxial cable 225 to a second female coaxial cable connector 226 and a ground bracket 228; the connectors 224 and 226 are externally threaded and such connectors and the ground bracket 228 are mounted to the housing 222 in a manner described in detail below and indicated diagrammatically in FIG. 3. Further generally, it will be understood that the female coaxial cable connector 224 is for being connected to the male coaxial cable connector 230 provided on the end of the coaxial cable 232 extending partially into the telephone network interface apparatus 10 and which coaxial cable 232 is for carrying incoming cable television signals from a suitable source. The female coaxial cable connector 226 is for being connected to the male coaxial cable connector 234 provided on the end of the coaxial cable 236 extending partially into the telephone network interface apparatus 10 and which coaxial cable 236 is for being connected to a television set not shown. Upon such connections being made, the television set is connected to the incoming cable television signals.

Referring now to FIGS. 2–4, and first in particular to FIGS. 2 and 4, the housing 222 is provided with a first indentation 240 extending inwardly of the top portion of the housing and a second indentation 242 extending inwardly into a top corner portion of the housing. As described in detail below, the indentation 242 facilitates removal or dismounting of the cable television module 220 from the telephone network interface apparatus 10 (FIG. 1) and the indentation 240 facilitates removal or dismounting of an individual subscriber line module, such as individual subscriber line module indicated by general numerical designation 91 in FIG. 5, from the telephone network interface apparatus 10 upon such individual subscriber line module 91 being mounted laterally of and in close proximity to the cable television module 220. The housing 222, FIG. 2, may be provided with members 261 and 262 providing a notch 264 therebetween for facilitating mounting of the module 220 to the telephone network interface apparatus 10 as described below. As may be best understood by reference to FIG. 3, the female coaxial cable television connector 226 may be mounted to the ground bracket 228 by threading and tightening the internally threaded nut 250 over the externally threaded connector 226, inserting the connector 226 through the opening 251 formed in the ground bracket 238, placing the washer 252 over the connector 226 and threading and tightening the internally threaded nut 253 over the externally threaded connector 226 to provide a sub-assembly indicated by general numerical designation 255 in FIG. 3. The housing 222, as may be understood from FIG. 3, is also provided at its lower forward portion with an upwardly extending slot 244 for receiving a portion of the ground bracket 228 and is provided in its left side portion, as viewed in FIG. 3, with an upwardly extending slot 246 for receiving the connector 226. The sub-assembly 255 is inserted internally of the housing 222, as indicated by the arrow 256 in FIG. 3, with the ground bracket 228 extending outwardly of the housing 222 through the slot 244 (FIG. 3) as shown in FIG. 2 and with the female coaxial connector 226 extending outwardly through the inwardly extending slot 246 (FIG. 3) as shown in FIG. 2. Thereafter, the washer 257, FIG. 3, is placed over the connector 226 and the internally threaded nut 258, FIG. 3, is threaded over the connector 226, as shown in FIG. 2, and tightened to mount the sub-assembly 255 to the housing 222. It will be understood, from FIGS. 1 and 2, that the mounting of the connector 226 and ground bracket 228 to the housing 220 is in a manner such that the connector 226 and ground bracket 228 reside at least partially internally of the housing 220 and such that the connector 226 is available for being connected to the coaxial cable 236, FIG. 1, extending into the telephone network interface apparatus 10. Thus, such mounting causes the female coaxial cable connector 226 to extend out of the housing 222 sufficiently to permit the connector 226 to be connected to the male connector 234 provided on the end of the coaxial cable 236 (FIG. 1) and such mounting also causes the ground bracket 228 to extend out of the housing 222 sufficiently to permit the ground bracket to be suitably connected to the ground buss 71 in the telephone company compartment 31 to thereby connect the coaxial cable connectors 224 and 226 to earth ground.

Figure 6:
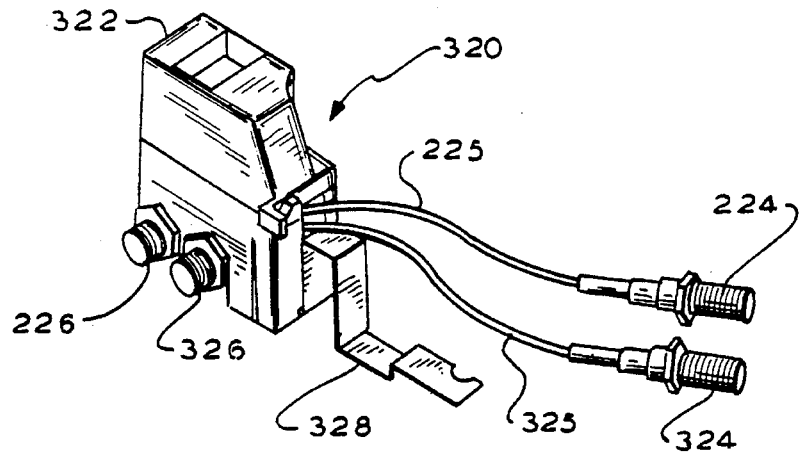
FIG. 6 is a perspective view of an alternate embodiment of a cable television module shown in the assembled condition.

Referring to FIG. 4, the lower rear portion of the housing 222 of the cable television module 220 is provided with an outwardly extending member 248, and referring now to FIG. 5, the cable television module 220 is mounted removably to the bottom 20 of the telephone network interface apparatus 10 by pivoting the cable television module 220 leftwardly as viewed in FIG. 5 and by inserting the outwardly extending member 248 (FIG. 4) under one of the upwardly extending mounting members 110, as shown in FIG. 10 of the '209 patent, by manually bending or flexing the upwardly extending member 11a' rightwardly as viewed in FIG. 5, by pivoting the cable television module 220 rightwardly to place the notch 264 (FIG. 2) under the tab 11b' after which the member 11a' is released to allow the member 11a' to pivot leftwardly as viewed in FIG. 6 to permit the tab 11b' to enter and wedgedly engage the notch 264. To remove or dismount the cable television module 220 from the telephone network interface apparatus 10, the above-described mounting procedure is reversed and it will be understood that the indentation 240 formed in the top portion of the housing 222 may receive a portion of the thumb or finger of a person to facilitate pivoting of the cable television module 220 as described above to facilitate mounting and/or dismounting of the module to and from the telephone network interface apparatus 10.

As noted above and as is shown in FIG. 5, an individual subscriber line module 91, such as individual subscriber line module 91 shown in FIGS. 12–17 of the '209 patent and described in detail therein, may be mounted laterally of and in close proximity to the cable television module 220 and it will be understood that the individual subscriber line module 91 is mounted to the apparatus 10 by inserting an outwardly extending member, such as member 114 as shown in FIG. 10 of the '209 patent under one of the upwardly extending mounting members 110 and by the tab 11b" by the member 11a" being received in a corresponding notch provided in the module 91 or by the tab 11b" extending over a portion of the top 170 of the module 91. It will be further understood that the indentation 242 formed in the corner portion of the cable television housing 220 may receive a portion of the thumb or finger of a person to facilitate grasping of the individual subscriber line module 91 to facilitate the individual subscriber line module being pivoted leftwardly as viewed in FIG. 1 to facilitate its removal or dismounting from the telephone network interface apparatus 10.

It will be understood, FIG. 5, that the telephone network interface apparatus 10, cable module 20 mounted removably to the apparatus 10, and the individual subscriber line module 91 mounted removably to the apparatus 10 comprise an embodiment of the combination apparatus of the present invention for connecting incoming telephone company wiring or lines to telephone subscriber premises wiring or lines and for connecting incoming cable television signals to a television set.

Referring again to FIG. 1 and to the demarcation points referred to above, it will be understood that upon the television set of a cable television customer not working, which customer also may be a telephone subscriber or customer, the customer may unfasten and open the subscriber cover 16 and disconnect the female coaxial cable connector 226 from the male coaxial cable connector 234 to provide a demarcation point between the customer's television set and the source of incoming cable television signals. The customer may thereafter connect a second television set, such as for example a portable television set, to the female coaxial cable connector 226 and in the event that the second television set receives a television picture and sound, the customer may reasonably determine that the failure of the first television set to receive a television picture and sound is due to the first television set not working. On the other hand, upon the customer connecting the second television set to the female coaxial cable connector 226 and upon the failure of such second television set to provide a television picture and sound, the customer may make a reasonable determination that the failure of the first television set to work is due to the failure to receive incoming coaxial cable signals. Also, a cable television repairman, which upon the Regional Bell Operating Companies being able also to provide cable television signals in addition to telephone service may be also the telephone company repairman, may open the telephone company cover 14 and disconnect the female coaxial cable connector 224 and the male coaxial cable connector 230 to provide a demarcation point between the customer's television set and the incoming cable television signals. Such repairman may then connect suitable cable television signal test apparatus to the male coaxial cable connector 230 and in the event that such test apparatus indicates reception of incoming coaxial cable television signals the cable television repairman may make a reasonable determination that the failure of the customer's television set to provide pictures and sound is due to the set not working. Alternatively, if such cable television signal testing apparatus does not indicate reception of incoming cable television signals a reasonable determination is made that the failure of the customer's television set to provide picture and sound is due to the failure to receive incoming cable television signals. The cable television repairman may also disconnect the female coaxial cable connector 226 and male coaxial cable connector 234 to provide a demarcation point therebetween and thereafter connect the cable television signal testing apparatus to the female coaxial cable connector 226 and make a determination, after having made the preceding described determination, as to whether the cable television module 220 is working or not.

Figure 7:
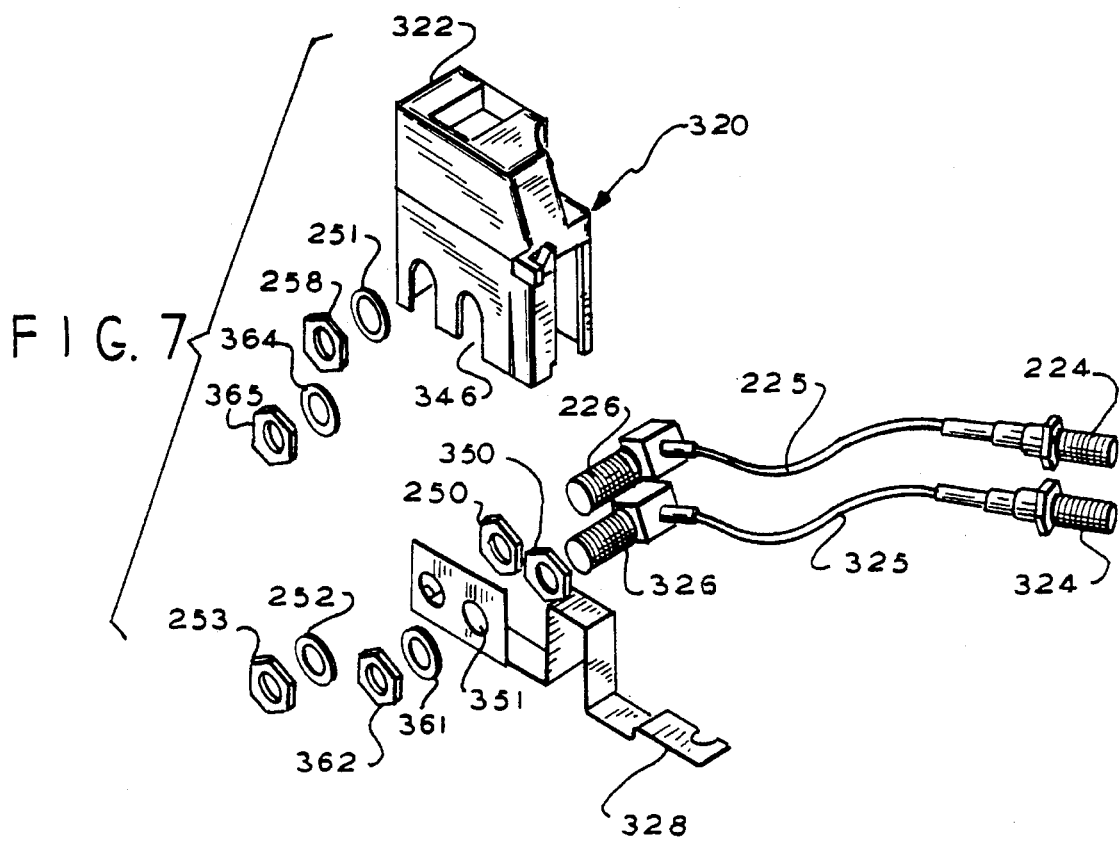
FIG. 7 is a perspective exploded view of the cable television module of FIG. 5 shown in the disassembled condition.

In the event that it is desired to connect or carry additional incoming cable television signals to the television set beyond the capacity of the coaxial cable 232 (FIG. 1) to carry cable television signals, an alternate embodiment cable television module of the present invention indicated by general numerical designation 320 and shown in FIGS. 6 and 7 may be utilized. Cable television module 320 is the same as cable television module 220 except that cable television module 320 includes additional coaxial cable connectors 324 and 326 interconnected by a length of coaxial cable 325 and the housing 322 includes a second inwardly extending slot 346, FIG. 7, for receiving the connector 326, additionally the ground bracket 328 includes an opening 351 for receiving the connector 326. It will be understood that the coaxial cable connector 226 is mounted to the ground bracket 328 and to the housing 322 as described above with regard to housing 322, and it will be further understood that the coaxial cable connector 326 is mounted to the ground bracket 328 and the housing 322 by the internally threaded nuts 350, 362, and 365 and the washers 361 and 364 in the same manner that the connector 226 is mounted to the ground bracket 228 and housing 222 of FIGS. 2 and 3 as described above. It will be further understood by referring to FIG. 6 that upon such mounting the female coaxial cable 326 resides at least partially internally of the housing 322 and extends outwardly of the housing sufficiently to permit the connector 326 to be connected to a coaxial cable, not shown, which would extend into the telephone subscriber compartment 32 of FIG. 1 and which would be connected to the television set. It will be further understood by reference to FIG. 5 that the coaxial cable connector 324 is made available for connection to an additional coaxial cable, not shown, which would extend into the telephone compartment 31 of FIG. 1 and which would carry additional incoming cable television signals from a suitable source. Such connections would permit additional incoming cable television signals to be carried to the television set. It will be further understood that instead of carrying additional incoming cable television signals to a single television set the alternate embodiment cable television module 320 may be used to carry incoming cable television signals to a second television set which may be a television set of a single telephone subscriber or customer or may be used to carry cable television signals to another telephone company subscriber or customer whose subscriber premises line or wiring is also connected to an incoming telephone company line by the telephone network interface apparatus 10.

It will be further understood that the female connectors 324 and 326 of FIG. 6 may be disconnected from the male coaxial cable connectors (not shown) of the coaxial cables described above for carrying the additional incoming cable television signals and for connecting such additional incoming cable television signals to the customer's cable television set to provide demarcation points in the same manner as described above with regard to the disconnection of the female connectors 224 and 226 (FIG. 7) from the male coaxial cable connectors 230 and 234.

Figure 8:
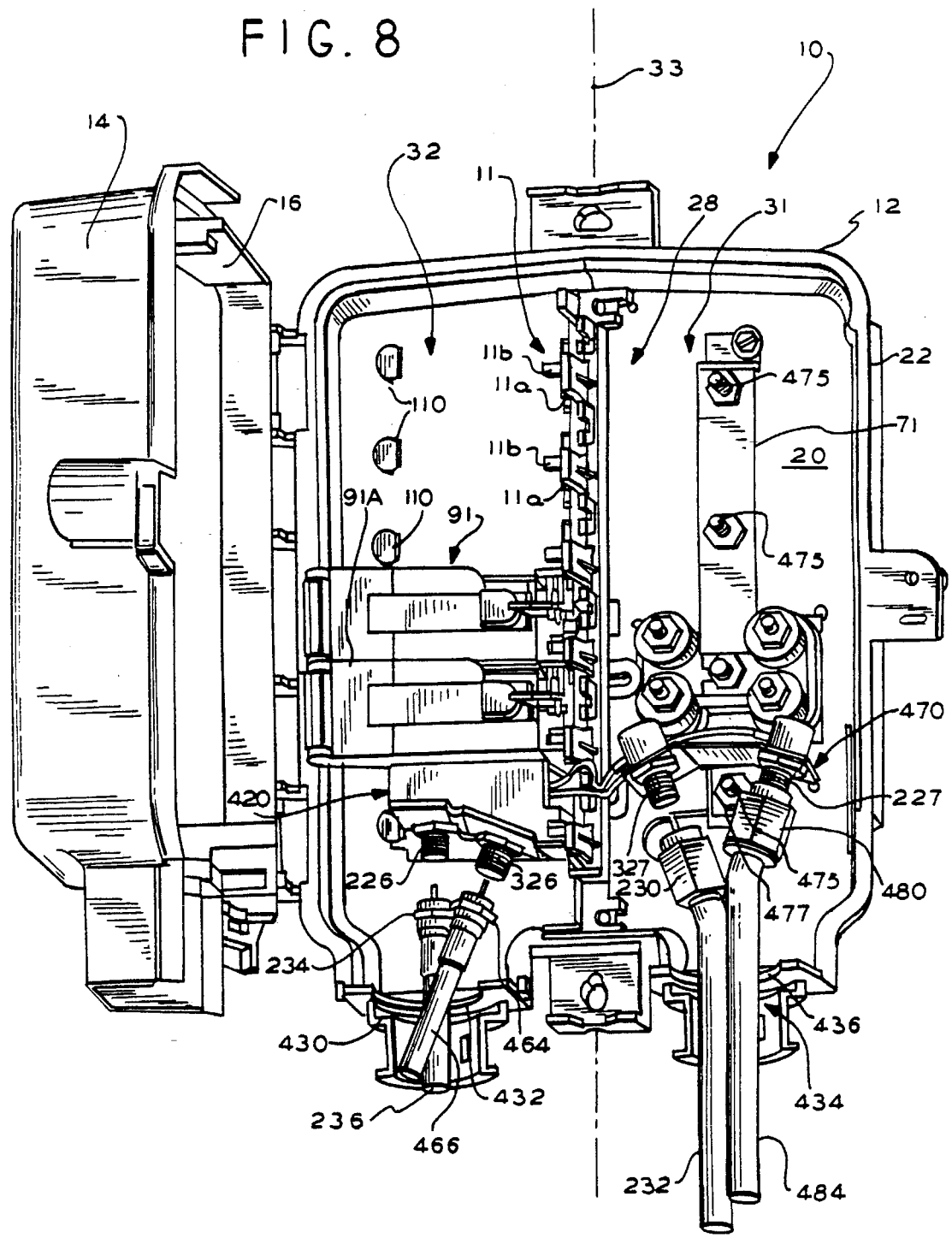
FIG. 8 is a front perspective view showing an alternate embodiment of combination telephone network interface apparatus and cable television module mounted to the apparatus, the telephone network interface apparatus is substantially the same as that disclosed in the '209 patent.

Referring now to FIGS. 8–12, a further alternate embodiment cable television module of the present invention is indicated by general numerical designation 420 and is shown in FIG. 8 as being mounted removably to the telephone network apparatus 10. It will be understood that structural elements shown in FIGS. 8–12 which are the same as structural elements shown in FIGS. 1–7 and described above are given the same numerical designations and have the same functions as described above. Cable television module 420 is particularly useful as an alternative to the cable television module 320 shown in FIGS. 6 and 7 and described above. While the design and structure of cable television module 320 is useful in interconnecting two coaxial cables carrying incoming cable television signals with two coaxial cables to be connected to one or more television sets, the design and structure do present some difficulty in the threaded interconnecting of the male coaxial cable connectors of two coaxial cables to the female coaxial cable connectors 226 and 326 of FIG. 6. This difficulty is due to the fact that the two coaxial cables connected to such female coaxial cable connectors enter a single coaxial cable access opening of relatively limited size or dimension provided in the telephone network interface apparatus 10. This coaxial cable access opening is indicated by general numerical designation 430 in FIG. 8 and it will be noted that the pair of outgoing coaxial cables 236 and 466 both enter the single access opening 230. It will be understood that upon the pair of coaxial cable connectors 226 and 326 of cable television module 320, FIG. 6, being mounted in a parallel manner to the module, and upon the pair of outgoing coaxial cables 236 and 466 (FIG. 8) entering the single coaxial cable access opening 430, there is a tendency for the pair of male coaxial cable connectors 234 and 464 (FIG. 8) to unwantedly contact and interfere with each other as they are connected respectively to the parallel mounted coaxial cable connectors 226 and 326 of FIG. 6. Generally, it will be understood that by mounting the pair of female coaxial cable connectors 226 and 326 at an angle with respect to each other as shown in FIG. 8, the interconnecting of the male coaxial cable connectors 234 and 464 to the angularly mounted female coaxial cable connectors 226 and 326 is facilitated or made easier. Access opening 430 is defined by generally semi-circular portion 432 provided on the base 20 of the telephone network interface apparatus 10 which semi-circular portion 432 is opposed by a correspondingly located semi-circular portion (not shown) provided on the subscriber cover 16. These opposed semi-circular portions, upon the subscriber cover 16 being fastened to the telephone network interface apparatus base 20, provide a generally circular opening which, as known to those skilled in the art, is typically filled with a grommet providing a seal with the coaxial cables entering the access opening 430 upon the coaxial cables being inserted through the grommet. Referring still to FIG. 8, it will be understood that the telephone network interface apparatus 10 provides a second coaxial cable access opening indicated by general numerical designation 434. The coaxial cable access opening 434 is provided in substantially the same manner as the coaxial cable access opening 430 but is defined by a generally semi-circular indentation or portion 436 and a corresponding semi-circular portion, not shown, provided in the telephone company cover 14.

Cable television module 420, FIGS. 9 and 10, includes a housing indicated by general numerical designation 422 which, as may be best understood from FIG. 10, includes a bottom housing portion indicated by general numerical designation 440 and a top housing portion indicated by general numerical designation 442. Bottom housing portion 440 includes two front wall portions 443 and 444 provided, respectively, with inwardly extending generally semi-circular indentations or portions 445 and 446. Referring still to FIG. 10, upper housing portion 442 includes front wall portions 448 and 449 provided, respectively, with inwardly extending generally semi-circular indentations or portions 451 and 452. It will be understood that upon the bottom and top housing portions 440 and 442 being assembled as shown in FIG. 9, the inwardly extending semi-circular portions 445 and 446 and 451 and 452 of FIG. 10 cooperatively provide generally circular openings through which the female conductors 226 and 326 of FIG. 10 extend outwardly. The upper housing portion 442 is also provided with an inwardly extending slot 454 which, upon the bottom and top housing portions 440 and 442 being assembled, provides an opening through which the coaxial cables 225 and 325 extend outwardly as shown in FIG. 8.

It will be further understood from FIG. 10 that the lower housing portion 440 is also provided with an upwardly extending cylindrical portion 455 having a cylindrical passageway 456 extending therethrough for receiving the threaded fastener or screw 458. The top housing portion 442, FIG. 10, is provided with a corresponding cylindrical portion 458, shown in dashed outline in FIG. 10, which may have, for example, a threaded insert (not shown) inserted therein for threaded engagement with the threaded fastener screw 458 to assemble the bottom housing portion 440 and 452 as shown in FIG. 9. It will be understood that upon such assembly the top and bottom housing portions 440 and 442 cooperatively provide an internal compartment for receiving portions of the female coaxial cable connectors 226 and 326 of FIG. 9 and which connectors are secured to the cable television module 420 by the washers 252 and 361 and internally threaded nuts 253 and 362 in the same general fashion that such washers and nuts shown in FIG. 7 mount the female coaxial connectors 226 and 326 of FIG. 7 to the cable television module 320 as described above. On being so mounted, it will be understood from FIG. 9 that the female coaxial cable connectors 226 and 326 extend sufficiently outwardly of the module to permit their connection to male coaxial cable connectors.

Referring again to FIG. 10, it will be particularly noted that the front wall portions 443 and 444 of the bottom housing portion 440 are disposed angularly with respect to each other and at an included obtuse angle Θ which is about 165° to about 175° and preferably about 170°. Similarly, in FIG. 9, it will be understood that the front wall portions 448 and 449 of the top housing portion 442 are also disposed angularly with respect to each other and at the same included obtuse angle Θ. Thus, upon the lower and bottom housing portions 440 and 442 being assembled as shown in FIG. 9, such respective front wall portions cooperatively provide the module 420 with front wall portions which are angularly disposed and provided with the included obtuse angle Θ. This disposes the female coaxial cable connectors 226 and 326 angularly with respect to each other with the included obtuse angle Θ.

Referring again to FIG. 8, it will be presumed that the cable television module 420 has been mounted removably to the base 20 of the telephone network interface apparatus 10 by substantially the same method in which the earlier described cable television modules 220 and 320 of the present invention were mounted to the base 20 of the telephone network interface apparatus 10 as shown in FIG. 1. The bottom portion 40 of the cable television module 420 may be provided with a pair of downwardly extending members 471 and 472 as shown in FIGS. 9 and 10 which downwardly extending members may be received in holes or openings (not shown) provided in the base 20 of the telephone network interface apparatus 10 the same as the hole 112 shown in FIG. 10 of the '209 patent. It will be understood from FIG. 8 that the angular disposition of the front wall portions of the top and bottom module housing portions having an included obtuse angle Θ as described above and as shown in FIGS. 9 and 10 present the female coaxial connectors 226 and 236 angularly as described above and for a more convenient threaded interconnection with the male coaxial cable connectors 234 and 464 provided respectively at the ends of the coaxial cables 236 and 466 shown in 10 as being inserted through the coaxial cable access opening 430. The coaxial cables 236 and 466 may carry incoming cable television signals to one or two television sets of a telephone subscriber whose telephone subscriber line may be connected to an incoming telephone company line by one of the individual telephone modules 91 or 91A shown in FIG. 8, or the coaxial cables 236 and 466 may connect or carry incoming cable television signals to the television sets of two different telephone company customers or subscribers whose subscriber lines or wiring may be connected to two incoming telephone lines or wiring by such individual subscriber line modules 91 and 91A. Thus, it will be understood that comparatively the angular disposition of the female coaxial cable connectors 226 and 326 facilitates interconnection with the male connectors 234 and 464 as compared to the female coaxial cable connectors 226 and 326 disposed in a parallel fashion as shown in FIG. 6 with regard to the cable television module 320.

Referring now to FIGS. 8 and 11, the cable television apparatus of the present invention may further include a ground bracket indicated by general numerical designation 470 made of a suitable electrically conductive material as the ground bracket 228 of FIG. 2 and the ground bracket 328 of FIG. 6. The ground bracket 470 may include a portion 472, FIG. 11, provided with an opening or hole 473 for receiving an externally threaded mounting stud 475, FIG. 8, connected electrically to and extending upwardly from the ground buss 71. An internally threaded nut 477, FIG. 8, may be provided to threadedly engage the mounting stud 475 to mechanically fasten and electrically interconnect the ground bracket 470 to the ground buss 71. Referring again to FIG. 11, the ground bracket 470 may further include angularly disposed portions 481 and 482 and an integrally formed intermediate portion 483. It will be particularly understood from FIG. 11 that the angular portions 481 and 482 are disposed angularly with respect to the intermediate portion at an included angle α and that the angularly disposed portions 481 and 482 are also disposed angularly with respect to each other at an included angle β. The angle α is about 155° to about 165° and preferably about 160°, and the angle β is about 145° to about 155° and preferably is about 140°.

Figure 12:
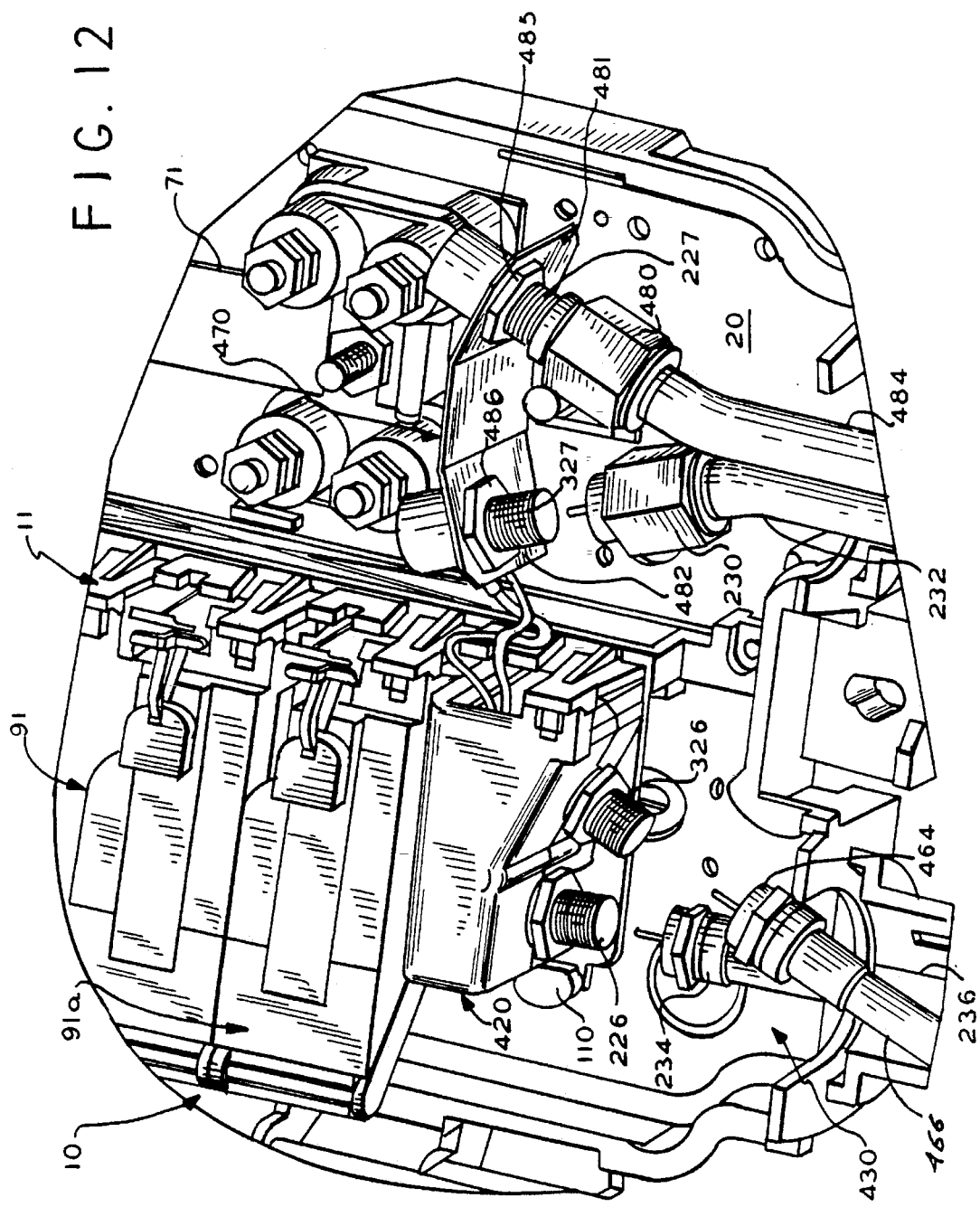
FIG. 12 is an enlarged view in perspective of a portion of FIG. 8 showing a pair of individual subscriber line modules mounted to the telephone network interface apparatus laterally of and in close proximity to the alternate cable television module embodiment.

The angularly disposed portions 481 and 482 of the ground bracket 70, FIG. 11, are provided with respective holes or openings 484 and 485 for receiving the female coaxial cable connectors 227 and 327, FIGS. 9 and 10, which extend therethrough for mechanical and electrical interconnection to the ground bracket by internally threaded nuts 485 and 486 as may be best seen in FIG. 12.

It will be understood from FIG. 12 that upon the ground bracket 470 being mounted to the base 420 of the telephone network interface apparatus 10 the angularly disposed portions 481 and 482 of such ground bracket present the female coaxial cable connectors 227 and 327 angularly for threaded interconnection with the male coaxial cable connectors 230 and 480 provided respectively on the incoming pair of coaxial cables 232 and 484 carrying incoming cable television signals and both extending through the single coaxial cable access opening 434 shown in FIG. 8. The angular disposition of the female coaxial cable connectors 227 and 327 due to their mounting in the angularly disposed ground bracket portions 481 and 482 facilitate such threaded interconnection between the female coaxial cable connectors 227 and 327 and the male coaxial cable connectors 230 and 480 in the same manner that angularly disposed female coaxial cable connectors 226 and 326 facilitate threaded interconnection to the male coaxial cable connectors 234 and 464 as shown in FIG. 12 and described above.

It will be understood, FIG. 8, that the telephone network interface apparatus 10, individual subscriber line module 91 and/or 91A and cable television module 420 comprise a further alternate combination embodiment of the present invention.

Figure 13:
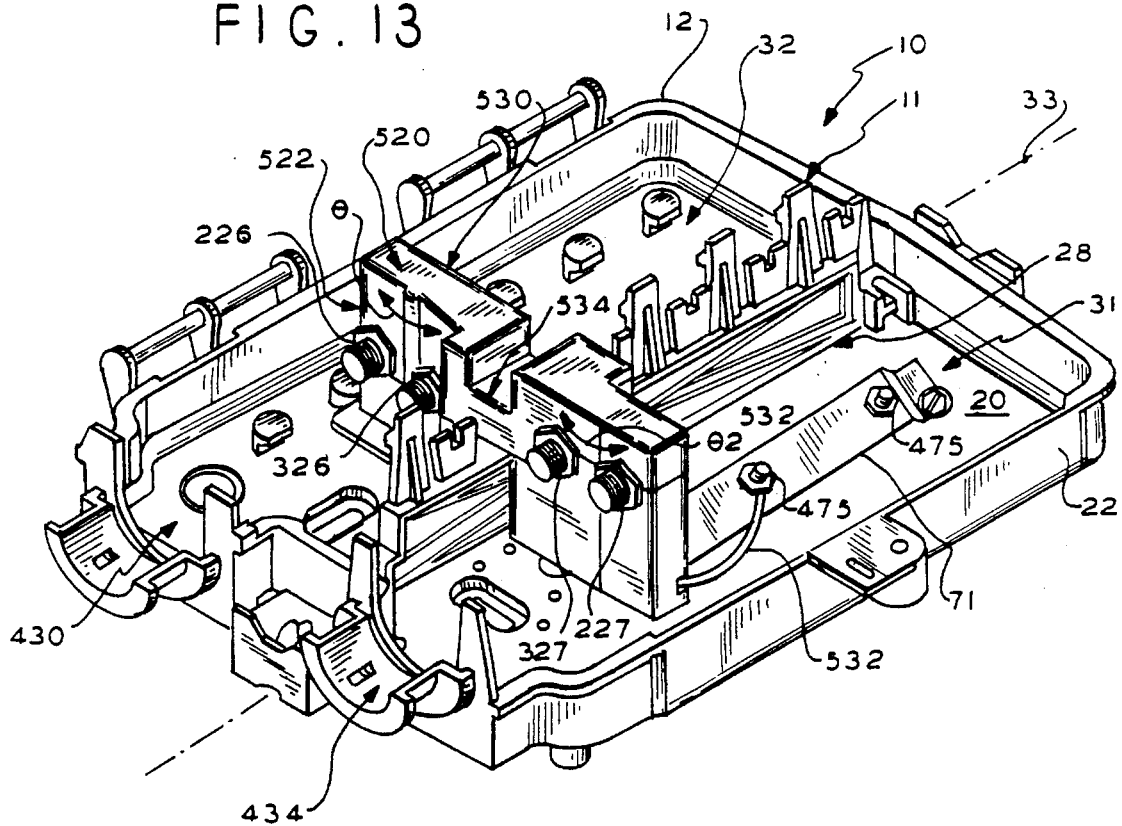
FIG. 13 is a perspective view of a portion of a further embodiment of combination telephone network interface apparatus and an alternate cable television module embodiment shown mounted to the base of the telephone network interface apparatus.

Referring now to FIGS. 13–16, a further alternate embodiment cable television module of the present invention is indicated by general numerical designation 520 and is shown in FIG. 13 as being mounted removably to the telephone network interface apparatus 10; cable television module 520 is mounted to the bottom 20 of the base 22 of the telephone network interface apparatus 10 in the same manner that cable television module 420 of FIGS. 8–12 is mounted to the bottom of the base of the telephone network interface apparatus 10 as described above. It will be further understood that the structural elements shown in FIGS. 13–16 which are the same as the structural elements shown in FIGS. 8–12 and described above are given the same numerical designations and have the same functions as described above. Cable television module 520 is particularly useful as an alternative to the cable television module 420 shown in FIGS. 8–12 and described above. While cable television module 420 works sufficiently well to perform its function described above, it has been found that there is a need in the art to protect or shield the interconnecting coaxial cables 225 and 325, note FIGS. 9 and 10, from undesirable or unintended contact, particularly by telephone company personnel or repairmen performing work functions in the telephone company compartment 31 (FIG. 8) and which contact can unintentionally disconnect the interconnecting coaxial cable connectors 227 and 327 from the ground bracket 470 (FIG. 8) or possibly break the conductors 227 and 327.

It will be understood generally that the cable television module 520 mounts the first pair of coaxial cable connectors 226 and 326 angularly with respect to each other, at the included angle Θ, in the same manner as the cable television module 420 of FIGS. 8–12 to facilitate connection of the coaxial cable connectors 226 and 326 to the coaxial cable connectors, such as connectors 234 and 464, of outgoing coaxial cables carrying incoming cable television signals to a television set, or sets, such as coaxial cables 236 and 466 of FIG. 12 which enter the telephone network interface apparatus 10 through a single cable access opening such as opening 430 shown in FIGS. 8 and 12. The cable television module 520 also mounts a second pair of coaxial cable connectors 227 and 327 angularly with respect to each other, at an included angle Θ2 (FIGS. 13 and 16) to facilitate connection of the coaxial cable connectors 227 and 327 to the coaxial cable connectors of a pair of incoming coaxial cables carrying incoming cable television signals such as connectors 230 and 480 of incoming pair of coaxial cables 232 and 484; cables 232 and 484 enter a single cable access opening such as coaxial cable access opening 434 shown in FIGS. 8 and 13. It will be noted particularly from FIGS. 13 and 16 that the included angle Θ at which the coaxial cable connectors 226 and 327 are mounted angularly with respect to each other is an obtuse angle less than 180° and that the included angle Θ2 at which the pair of coaxial cable connectors 227 and 327 are mounted with respect to each other is an angle in excess of 180°. It has been found that this angularity of mounting of the coaxial cable connectors, whether at an angle of less than 180° or at an angle greater than 180° facilitates connections of such connectors to coaxial cable connectors provided on the ends of the coaxial cables entering and exiting a telephone network interface apparatus particularly through a single coaxial cable access opening.

Figure 14:
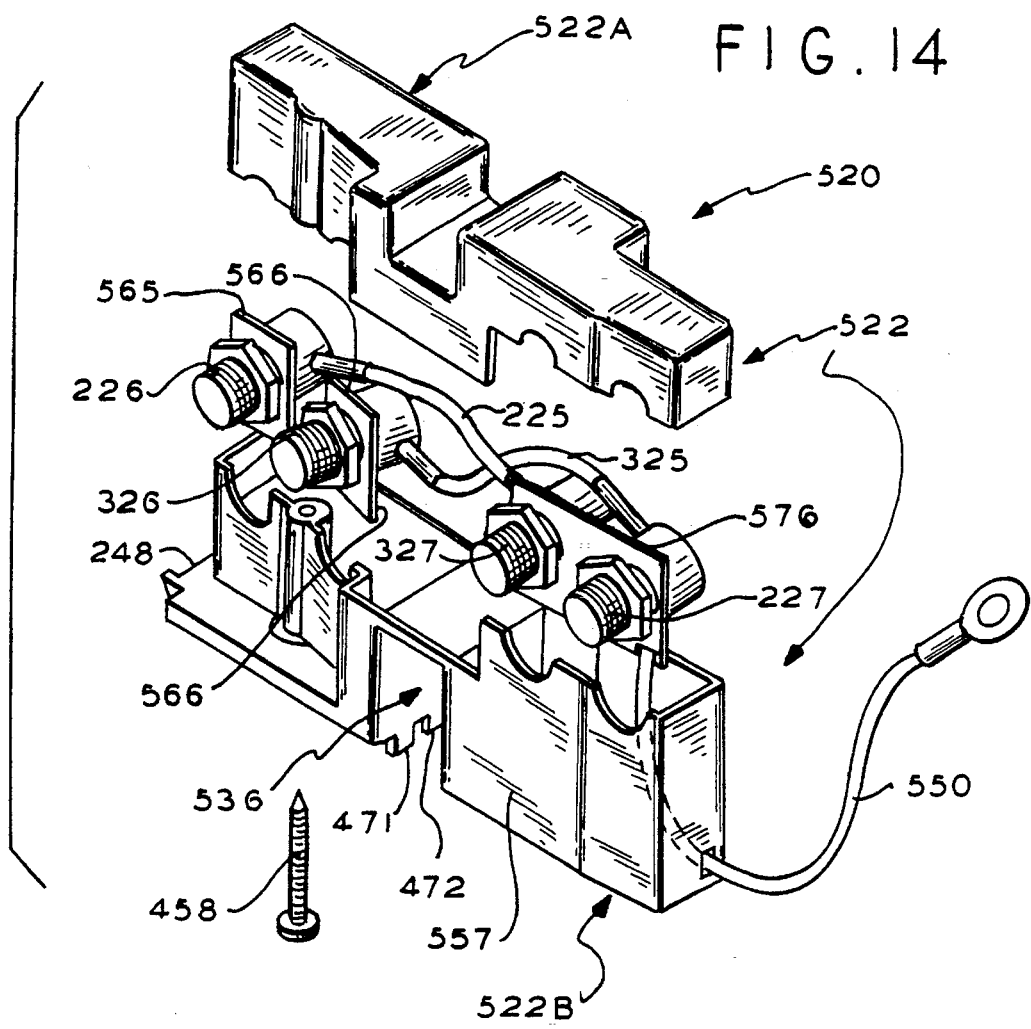
FIG. 14 is an exploded view of the alternate embodiment cable television module shown in FIG. 13.

Cable television module 520, FIGS. 13 and 14, includes a housing indicated by general numerical designation 522 and which housing, FIG. 14, includes a top housing portion 522A and a bottom housing portion 522B. The top and bottom housing portions are fastened together in substantially the same manner as the top and bottom housing portions 442 and 443 of television module 420, FIGS. 9 and 10, by the threaded fastener 458 and by the internally threaded nuts 541, 542, 543 and 544 (FIG. 15) and underlying washers, which threadedly engage the coaxial cable connectors 226, 326, 227 and 327 to assist in mounting or clamping the top and bottom housing portions together as may be noted from FIGS. 13 and 16. From FIGS. 14 and 15, it will be noted that the housing 522 is a substantially hollow housing for protecting and shielding the interconnecting coaxial cables 225 and 325, which interconnect the pair of coaxial cable connectors 226 and 326 and 227 and 327, from unintentional and undesirable contact particularly by telephone company personnel performing work functions in the telephone company compartment 31 (FIG. 13) and, of course, by telephone subscribers performing work functions in the telephone subscriber compartment portion 332 (FIG. 13).

Referring again to the housing 522, and to FIGS. 13 and 16, it will be noted that the housing 522 includes generally opposed housing end portions indicated by general numerical designations 530 and 532 and an intermediate housing portion indicated by general numerical designation 534. Intermediate portion 534, as may be noted particularly from FIGS. 14 and 16, is provided with an inwardly extending slot or groove 536 is for receiving and residing over the upwardly extending module mounting or retaining member 11 shown in FIG. 13.

Figure 16:
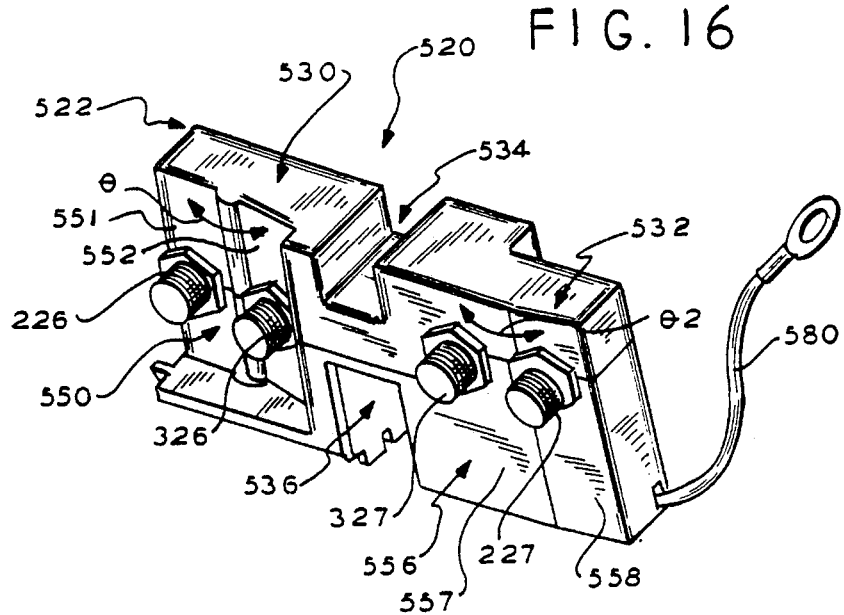
FIG. 16 is a perspective view of the cable television module of FIG. 13 above.

Referring now to FIG. 16, and to the further detailed structure of the cable television module 520, it will be understood that the housing end portion 530 includes a wall indicated by general numerical designation 550. Wall 550 includes wall portions 551 and 552 disposed angularly with respect to each other at the included obtuse angle Θ. Upon the coaxial cable connectors 226 and 326 being mounted to, as described above, and extending through the respective wall portions 551 and 552, the coaxial cable connectors are disposed with respect to each other at the obtuse included angle Θ. The end housing portion 532 includes a wall indicated by general numerical designation 556 which wall includes wall portions 557 and 558. The wall portions 557 and 558 are disposed angularly with respect to each other at the angle Θ2, greater than 180°, whereby upon the coaxial cable connectors 227 and 327 being mounted to the wall 556 as noted above the coaxial cable connectors are disposed angularly with respect to each other at the obtuse included angle Θ2.

Figure 15:
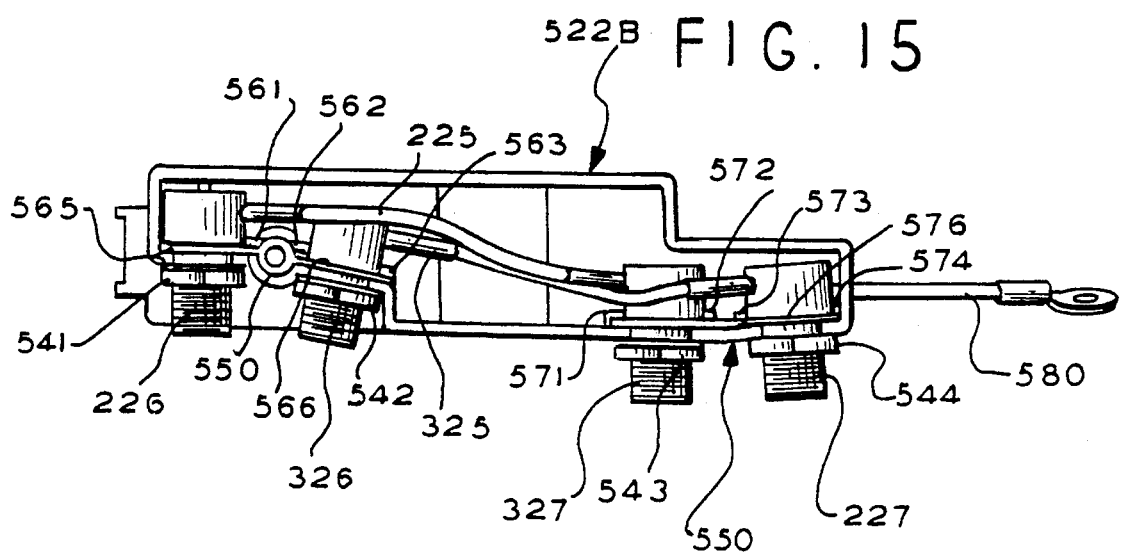
FIG. 15 is a top view of the lower portion of the cable television module shown in FIG. 14.

Referring in further detail to the mounting of the coaxial cable connectors 226 and 326 and 327 and 227 to the walls 550 and 556, and referring particularly to FIG. 15, it will be noted that the coaxial cable connectors 226 and 326 reside partially internally of the wall 550 and extend through and reside partially externally of the wall 550. Similarly, the pair of coaxial cable connectors 327 and 227 reside partially internally of the wall 556 and extend through and reside partially externally of the wall 556. It will be understood from FIGS. 14 and 15 that mounting members 565 and 566 are mounted respectively to connectors 226 and 326 and that mounting member 576 is mounted to both connectors 227 and 327, and that the internal portion of the wall 550 is provided with internal mounting members 561, 562 and 563 for receiving mounting members 565 and 566 (better seen in FIG. 14) to assist in mounting the coaxial cable connectors 226 and 326 to the wall 560. Similarly, wall 556, FIG. 15, is provided with internal mounting members 572, 573 and 574 for receiving the mounting member 576 (better seen in FIG. 14) to assist in mounting the coaxial cable connectors 327 and 227 to the wall 556. It will be understood that the mounting members 565, 566 and 576 are made of electrically conductive material and that the interconnecting cables 225 and 325 in addition to interconnecting the pairs of coaxial cable connectors as described above also electrically interconnect the outer portions of the pairs of coaxial cable connectors together and to the mounting member 576 to which is electrically connected a flexible ground strap or cable 580 which is connected to the ground buss 71 by one of the mounting studs 476 as shown in FIG. 13.

It will be understood that one or more individual subscriber line modules, such as individual subscriber line module 91 of FIGS. 5 and 12, is mounted removably to the bottom 20 of the base 22 of the telephone network interface apparatus 10 of FIG. 13 in the same manner as shown in FIG. 5 and described above. Such individual subscriber line module 91, as described above, connects one incoming telephone line to one telephone subscriber premises line and thus such individual subscriber line module 91, telephone network interface apparatus 10, and cable television module 520 combine to provide a combination embodiment of the present invention. The cable television module 520, alone, also comprises an embodiment of the present invention.

Referring again to the coaxial cable connectors, it will be understood that the coaxial cable connectors 226, 326, 227 and 327 may be commercially available F type right angle female coaxial connectors, that the coaxial cable connectors 224 and 324 may be commercially available F type in line female coaxial cable connectors and that the lengths of coaxial cable 225 and 325 may be commercially available RG179 coaxial cable.

It will be understood by those skilled in the art that many modifications and variations may be made in this invention without departing from the spirit and the scope thereof.

What is claimed is:

1. Apparatus for interconnecting incoming cable television signals to two coaxial cables, comprising:

cable television module means for being mounted to telephone network interface apparatus for connecting at least one incoming telephone line to at least one telephone subscriber's line, said telephone network interface apparatus including coaxial cable access means for permitting said two coaxial cables to be inserted therethrough;

said cable television module means including first and second module portions generally disposed opposite said access means upon said cable television module means being mounted to said telephone network interface apparatus;

said cable television module means including at least first and second coaxial cable connectors mounted respectively to said first and second module portions and for carrying said incoming cable television signals, said first and second module portions disposed angularly with respect to each other at a first included angle; and said angular disposition of said first and second module portions disposing said first and second coaxial cable connectors angularly with respect to each other to facilitate connection thereto of said two coaxial cables.

2. The apparatus according to claim 1 wherein said cable television module means further includes a ground bracket and third and fourth coaxial cable connectors interconnected to said first and second coaxial cable connectors to carry said incoming television signals from said third and fourth coaxial cable connectors to said first and second coaxial cable connectors; wherein said telephone network interface apparatus includes second coaxial cable access means for permitting the entry therethrough of at least third and fourth coaxial cables for carrying said incoming television signals and said telephone network interface apparatus including a ground buss for being connected to earth ground, said ground bracket including mounting means for mounting said ground bracket to said ground buss and said ground bracket including at least first and second ground bracket portions for being disposed generally opposite said second coaxial cable access means, said first and second ground bracket portions disposed angularly with respect to each other at a second included angle, said third and fourth coaxial cable connectors mounted to said first and second ground bracket portions and disposed angularly with respect to each other at said second included angle, and said angular disposition of said third and fourth coaxial cable connectors facilitating connection thereto of said third and fourth coaxial cables.

3. The apparatus according to claim 2 wherein said ground bracket includes an intermediate portion intermediate said first and second ground bracket portions and said intermediate portion being disposed generally parallel to said second access means upon said ground bracket being mounted to said ground buss, said first and second ground bracket portions each disposed angularly with respect to said intermediate portion at a third included angle.

4. The apparatus according to claim 1 wherein said first included angle is an obtuse angle.

5. The apparatus according to claim 4 wherein said obtuse angle is the range of about 165° to about 175°.

6. The apparatus according to claim 4 wherein said obtuse angle is preferably about 170°.

7. The apparatus according to claim 2 wherein said second included angle is an obtuse angle.

8. The apparatus according to claim 2 wherein said obtuse angle is in the range of about 145° to about 155°.

9. The apparatus according to claim 7 wherein said obtuse angle is preferably about 140°.

10. The apparatus according to claim 3 wherein said third included angle is an obtuse angle.

11. The apparatus according to claim 10 wherein said obtuse angle is in the range of about 155° to about 165°.

12. The apparatus according to claim 10 wherein said obtuse angle is preferably about 160°.

13. Apparatus for interconnecting incoming cable television signals to two coaxial cables, said apparatus for being mounted to telephone network interface apparatus for connecting at least one incoming telephone line to at least one telephone subscriber's incoming line, said apparatus for interconnecting incoming cable television signals to two coaxial cables comprising:

cable television module means including first and second wall portions and first and second coaxial cable connectors mounted to and extending at least partially through said first and second wall portions and for carrying said incoming cable television signals; and said first and second wall portions disposed angularly with respect to each other at an included obtuse angle, said angular disposition of said first and second wall portions disposing said first and second cable connectors angularly with respect to each other to facilitate connection thereto of said two coaxial cables.

14. Cable television module for interconnecting incoming cable television signals to at least two coaxial cables, comprising:

module means for being mounted to telephone network interface apparatus through which at least one incoming telephone line may be connected to at least one telephone subscriber's line, said telephone network interface apparatus including coaxial cable access means for permitting said at least two coaxial cables to be inserted therethrough; and said module means including housing means provided with first and second wall portions and first and second coaxial cable connectors mounted to and extending at least partially through said first and second wall portions, said first and second coaxial cable connectors for carrying said incoming cable television signals, said first and second wall portions disposed angularly with respect to each other and having an included angle less than 180°, said angular disposition of said first and second wall portions disposing said first and second coaxial cable connectors angularly with respect to each other to facilitate connection thereto of said at least two coaxial cables.

15. Combination apparatus, comprising:

telephone network interface apparatus for interconnecting at least one incoming telephone line to at least one telephone subscriber's line, said telephone network interface apparatus including first mounting means;

cable television module including at least a first pair of coaxial cable connectors for carrying incoming cable television signals, said first pair of coaxial cable connectors mounted on said module at a first included angle with respect to each other to facilitate connection to a pair of coaxial cables for carrying said cable television signals to at least one television set, said module including second mounting means for engaging said first mounting means to mount said module to said telephone network interface apparatus.

16. The combination apparatus according to claim 15 wherein said module includes a second pair of coaxial cable connectors interconnected to said first pair of coaxial cable connectors and said second pair of coaxial cable connectors mounted on said module at a second included angle with respect to each other to facilitate connection of said second pair of coaxial cable connectors to a second pair of coaxial cables carrying the incoming cable television signals.

17. The combination according to claim 15 wherein said module includes a second pair of coaxial cable connectors interconnected to said first pair of coaxial cable connectors and a ground bracket mounted to said telephone network interface apparatus, said second pair of coaxial cable connectors mounted to said ground bracket at a third included angle with respect to each other to facilitate connection of said second pair of coaxial cable connectors to a second pair of coaxial cables carrying the incoming cable television signals.

18. The combination apparatus according to claim 16 wherein said telephone network interface apparatus comprises a base including a bottom circumscribed by an upwardly extending wall and an individual subscriber line module mounted to said base, said bottom and wall providing an apparatus compartment divided into a telephone company compartment and a telephone subscriber compartment, said telephone network interface apparatus further including an upwardly extending module mounting member mounted to said base between said telephone company and telephone subscriber compartments, said upwardly extending module mounting member assisting in mounting said individual subscriber line module to said base, said module comprising a substantially hollow housing including first and second end portions and an intermediate portion intermediate said first and second end portions, said first mounting means provided on said base in said telephone subscriber portion and said second mounting means provided on said first end portion of said module, upon said module being mounted to said bottom by the engagement of said first and second mounting means, said first end portion of said module residing in said telephone subscriber compartment and said second end portion of said module residing in said telephone company compartment, said first pair of coaxial cable connectors mounted to said first end portion of said module and residing in said telephone subscriber compartment and said second pair of coaxial cable connectors mounted to said second end portion of said module and residing in said telephone company compartment, and said intermediate portion of said module including an inwardly extending portion for receiving and residing over said upwardly extending module mounting member.

19. The combination apparatus according to claim 18 wherein one connector of said first and second pairs of coaxial cable connectors and the other connector of said first and second pair of coaxial cable connectors are respectively interconnected by interconnecting coaxial cable connectors and wherein said interconnecting coaxial cable connectors reside internally of said housing and wherein said housing shields and protects said interconnecting coaxial cable connectors against unintentional contact by telephone company subscribers and telephone company personnel performing work functions in said apparatus compartment.

20. The combination apparatus according to claim 18 wherein said first end portion of said housing includes a first wall portion and wherein said second end portion of said housing includes a second wall portion, wherein said first pair of coaxial cable connectors reside partially internally of said housing and extend partially outwardly of said first wall portion for connection to said first pair of coaxial cables, wherein said second pair of coaxial cable connectors reside partially internally of said housing and extend partially outwardly of said second wall portion for connection to said second pair of coaxial cables, said first and second pairs of coaxial cable connectors and said first and second wall portions provided with cooperative mounting means for mounting said first and second pairs of coaxial cable connectors respectively to said first and second wall portions.

21. The combination apparatus according to claim 18 wherein said telephone network interface apparatus includes a ground buss mounted to said bottom and wherein said module includes ground connecting means connecting said first and second pairs of coaxial cable connectors to said ground buss.

22. The combination apparatus according to claim 21 wherein said ground connecting means comprise a flexible ground strap including an end portion residing internally of said housing and connected to said first and second pairs of coaxial cable connectors.

23. The combination apparatus according to claim 15 wherein said first included angle is about 165° to about 175°.

24. The combination apparatus according to claim 15 wherein first said included angle preferably is about 170°.

25. The combination apparatus according to claim 16 wherein said second included angle is about 145° to about 155°.

26. The apparatus according to claim 16 wherein said second included angle preferably is about 150°.

27. The apparatus according to claim 17 wherein said third included angle is about 155° to about 165°.

28. The apparatus according to claim 17 wherein said third included angle preferably is about 160°.

29. Cable television module, comprising:
   a substantially hollow housing including generally opposed first and second end portions, said first end portion including a first wall and said second end portion including a second wall;
   a first pair of coaxial cable connectors and a second pair of coaxial cable connectors;
   said first pair of coaxial cable connectors residing partially internally of said first wall and extending through and residing partially externally of said first wall, said first pair of coaxial cable connectors and said first wall provided with cooperatively engaging first mounting means for mounting said first pair of coaxial cable connectors to said first wall;
   said second pair of coaxial cable connectors residing partially internally of said second wall and extending through and partially residing externally of said second wall, said second pair of coaxial cable connectors and said second wall provided with cooperatively engaging second mounting means for mounting said second pair of coaxial cable connectors to said second wall; and
   a pair of interconnecting coaxial cables respectively interconnecting one coaxial cable connector of said first pair of coaxial cable connectors with one coaxial cable connector of said second pair of coaxial cable connectors and the other coaxial cable connector of said first pair of coaxial cable connectors with the other coaxial cable connector of said second pair of coaxial cable connectors, said pair of interconnecting coaxial cables residing internally of said housing.

30. The cable television module according to claim 29 wherein said first wall includes first and second wall portions disposed at a first included angle with respect to each other, one of said coaxial cable connector of said first pair of coaxial cable connectors extending through said first wall portion and the other coaxial cable connectors of said first pair of coaxial cable connectors extending through said second wall portion whereby said coaxial cable connectors of said first pair of coaxial cable connectors are disposed at said first included angle with respect to each other to facilitate connection of said first pair of coaxial cable connectors to a first pair of coaxial cables.

31. The cable television module according to claim 29 wherein said second wall includes first and second wall portions disposed at a second included angle with respect to each other, one of said coaxial cable connectors of said second pair of coaxial cable connectors extending through said first wall portion and the other coaxial cable connector of said first pair of coaxial cable connectors extending through said second wall portion whereby said coaxial cable connectors of said second pair of coaxial cable connectors are disposed at said second included angle with respect to each other to facilitate connection of said second pair of coaxial cable connectors to a second pair of coaxial cables.

32. The apparatus according to claim 30 wherein said first included angle is an obtuse angle less than 180°.

33. The apparatus according to claim 31 wherein said second included angle is an angle in excess of 180°.

34. Apparatus for connecting incoming cable television signals to a television set, said apparatus for being mounted in telephone network interface apparatus including a housing and telephone connecting means for connecting at least one incoming telephone line to at least one telephone subscriber's line, said telephone connecting means mounted in the housing, and said housing comprising first and second compartments and providing first coaxial cable access means to said first compartment and providing second coaxial cable access means to said second compartment, said apparatus for connecting incoming cable television signals to a television set comprising:

support means and first and second coaxial cable connectors, said support means for being mounted to said housing, and said first and second connectors interconnected to carry said cable television signals from said first connector to said second connector;

said first connector mounted to said support means in a predetermined manner such that upon said support means being mounted to said housing said first connector resides in said first compartment and is disposed at an angle with respect to said first coaxial cable access means to facilitate connection to a coaxial cable extending through said first coaxial cable access means and into said first compartment, said first coaxial cable for carrying said incoming cable television signals; and said second coaxial cable connector mounted to said support means in a predetermined manner such that upon said support means being mounted to said housing said second coaxial cable connector resides in said second compartment and is disposed at an angle with respect to said second coaxial cable access means to facilitate connection to a second coaxial cable extending through said second coaxial cable access means and into said second compartment, said second coaxial cable for carrying said cable television signals to said television set.

35. Combination telephone and cable television apparatus, comprising:

telephone network interface apparatus including a housing providing first and second compartments and said housing providing first coaxial cable access means to said first compartment and second coaxial cable access means to said second compartment, said telephone network interface apparatus including electrical protection means and first ground connecting means mounted in said first compartment, said first ground connecting means connected to said electrical protection means and for being connected to earth ground, and telephone connecting means mounted in said second compartment for interconnecting at least one incoming telephone line to at least one telephone subscriber's line;

support means mounted to said housing and first and second coaxial cable connector, said first coaxial cable connector and said second coaxial cable connector interconnected to carry said incoming cable television signals from said first coaxial cable connector to said second coaxial cable connector;

said first coaxial cable connector mounted to said support means in a predetermined manner to dispose said first coaxial cable connector in said first compartment at an angle with respect to said first coaxial cable access means to facilitate connection to a first coaxial cable carrying said incoming cable television signals and extending through said first coaxial cable access means and into said first compartment;

said second coaxial cable connector mounted to said support means in a predetermined manner to dispose said second coaxial cable connector in said second compartment at an angle with respect to said second coaxial cable access means to facilitate connection to a second coaxial cable extending through said second coaxial cable access means and into said second compartment and for connecting said cable television signals to a television set; and second ground connecting means mounted to said support means and connected to said first ground connecting means to connect said first and second coaxial cable connectors to earth ground.

36. Combination telephone and cable television apparatus, comprising:

telephone network interface apparatus including a housing providing a telephone company compartment and a telephone subscriber compartment, and providing first coaxial cable access means to said telephone company compartment and providing second coaxial cable access means to said telephone subscriber compartment, said telephone network interface apparatus including electrical protection means mounted in said telephone company compartment and telephone connecting means mounted in said telephone subscriber compartment for connecting at least one incoming telephone line to at least one telephone subscriber's line, first ground connecting means residing in said telephone company compartment and connected to said electrical protection means and for connecting said electrical protection means to earth ground;

cable television signal connecting means for interconnecting incoming cable television signals to one or more television sets, said cable television signal connecting means including support means mounted in said telephone subscriber compartment and first and second and third and fourth coaxial cable connectors, said first and second coaxial cable connectors interconnected to carry said incoming cable television signals from said first coaxial cable connector to said second coaxial cable connector and said third and fourth coaxial cable connectors interconnected to carry said incoming cable television signals from said third coaxial cable connector to said fourth coaxial cable connector;

said first and third coaxial cable connectors mounted to said support means in a predetermined manner to reside in said telephone company compartment and to dispose at least one of said first and third coaxial cable connectors angularly with respect to said first coaxial cable access means to facilitate connection of said first and third coaxial cable connectors to first and second coaxial cables extending through said first coaxial cable access means and into said telephone company compartment and carrying said incoming cable television signals; and said second and fourth coaxial cable connectors mounted to said support means in a predetermined manner to reside in said telephone subscriber compartment and to dispose at least one of said second and fourth coaxial cable connectors angularly with respect to said second coaxial cable access means to facilitate connection of said second and fourth coaxial cable connectors to third and fourth coaxial cables extending through said second coaxial cable access means and into said telephone subscriber compartment and carrying said incoming cable television signals to said one or more television sets.

37. The apparatus according to claim 36 wherein said housing is provided with first mounting means and wherein said cable television signal connecting means is provided with second mounting means for mounting said cable television signal connecting means to said housing.

38. The apparatus according to claim 36 wherein said housing comprises a base including a bottom circumscribed by an upwardly extending wall providing an apparatus compartment divided into said telephone company compartment and said telephone subscriber compartment, said telephone network interface apparatus further including an upwardly extending module mounting member mounted to said base between said telephone company compartment and said telephone subscriber compartment, wherein said telephone connecting means comprise an individual subscriber line module, and wherein a portion of said individual subscriber line module and a portion of said support means are mounted to said upwardly extending module mounting member.

39. The apparatus according to claim 38 wherein said telephone network interface apparatus include a telephone company cover mounted pivotally to said housing and for being fastened closed over said telephone company compartment and for being unfastened by telephone company personnel and personnel associated with said cable television apparatus, and a telephone subscriber cover mounted pivotally to said housing and for being fastened closed at least over said telephone subscriber compartment and for being unfastened by a telephone subscriber, telephone company personnel, and personnel associated with said cable television apparatus.

40. Apparatus according to claim 34, 35, or 36 wherein said telephone connecting means provide a demarcation point to facilitate determination of whether a fault exists on said incoming telephone line or said telephone subscriber's line.

41. Apparatus according to claim 34 or 35 wherein said first and third coaxial cable connectors provide demarcation points to facilitate determination as to whether said television set is not working or whether said incoming cable television signals are not being received by said one or more television sets.

42. Apparatus according to claim 36 wherein said first and second and said third and fourth coaxial cable connectors provide demarcation points to facilitate determination of whether said one or more television sets are not working or whether said incoming cable television signals are not being received by said one or more cable television sets.

43. The apparatus according to claim 36 wherein said housing comprises a base including a bottom circumscribed by an upwardly extending wall providing an apparatus compartment divided into said telephone company compartment and said telephone subscriber compartment, said telephone network interface apparatus further including upwardly extending first module mounting means mounted to said base between said telephone company compartment and said telephone subscriber compartment and second module mounting means mounted to said base in said telephone subscriber compartment and spaced from said first module mounting means, wherein said telephone connecting means comprise an individual subscriber line module including opposed first and second ends, wherein said support means include opposed first and second ends, and wherein said first ends of said individual subscriber line module and said support means are mounted to said upwardly extending first module mounting means and wherein said second ends of said individual subscriber line module and said support means are mounted to said second module mounting means.

44. Cable television apparatus for being connected to at least two coaxial cables carrying incoming cable television signals, comprising:

means for being mounted to telephone network interface apparatus for connecting at least one incoming telephone line to at least one telephone subscriber's line, said telephone network interface apparatus including coaxial cable access means for permitting at least two coaxial cables carrying said incoming cable television signals to be inserted therethrough and into said apparatus; and said means including support means for being mounted to said telephone network interface apparatus and at least first and second coaxial cable connectors mounted to said support means in a predetermined manner to position said connectors angularly with respect to said coaxial cable access means to facilitate connection of said at least two coaxial cables to said first and second coaxial cable connectors.

45. Cable television apparatus for connecting incoming cable television signals to at least one television set, comprising:

support means and first and second coaxial cable connectors, said first and second coaxial cable connectors interconnected to carry said incoming cable television signals from said first coaxial cable connector to said second coaxial cable connector, said first and second coaxial cable connectors mounted on said support means at an angle with respect to each other and said support means provided with mounting means for mounting said module to a telephone network interface device for interconnecting at least one incoming telephone company line to at least one telephone company subscriber's line.

* * * * *